(12) United States Patent
Donnelly et al.

(10) Patent No.: US 7,311,216 B2
(45) Date of Patent: Dec. 25, 2007

(54) MODULAR CONTAINER ASSEMBLED FROM FIBER REINFORCED THERMOPLASTIC SANDWICH PANELS

(75) Inventors: Mathew William Donnelly, Edgewood, NM (US); William Andrew Kasoff, Albuquerque, NM (US); Patrick Carl Mcculloch, Irvine, CA (US); Frederick Truman Williams, Albuquerque, NM (US)

(73) Assignee: Aerobox Composites Structures, LLC, Rio Rancho, NM (US)

( * ) Notice: Subject to any disclaimer, the term of this patent is extended or adjusted under 35 U.S.C. 154(b) by 274 days.

(21) Appl. No.: 10/428,805

(22) Filed: Jul. 24, 2003

(65) Prior Publication Data
US 2004/0112907 A1   Jun. 17, 2004

(51) Int. Cl.
B65D 88/00   (2006.01)
(52) U.S. Cl. .................................................... 220/1.5
(58) Field of Classification Search ................ 220/1.5, 220/592.2, 592.25, 62.11, 62.22
See application file for complete search history.

(56) References Cited
U.S. PATENT DOCUMENTS

| | | | |
|---|---|---|---|
| 5,043,127 A | 8/1991 | Brambach | |
| 5,178,292 A | 1/1993 | Korzeniowski | |
| 5,227,113 A | 7/1993 | Hamabe et al. | |
| 5,398,831 A | 3/1995 | Avramides et al. | |
| 5,688,353 A | 11/1997 | Dublinski et al. | |
| 5,829,625 A * | 11/1998 | Imagawa | 220/567.1 |
| 5,979,684 A * | 11/1999 | Ohnishi et al. | 220/1.5 |
| 6,093,462 A * | 7/2000 | O'Herron et al. | 428/35.2 |
| 6,112,931 A * | 9/2000 | Booth et al. | 220/88.1 |
| 6,114,000 A | 9/2000 | Muroi et al. | |
| 6,161,714 A * | 12/2000 | Matsuura et al. | 220/1.5 |
| 6,551,441 B1 | 4/2003 | Sato et al. | |
| 6,615,741 B2 * | 9/2003 | Fecko et al. | 105/404 |
| 2003/0190452 A1 | 10/2003 | Lucas et al. | |

* cited by examiner

Primary Examiner—Anthony D. Stashick
Assistant Examiner—Harry A Grosso
(74) Attorney, Agent, or Firm—Vincent P. Bailey, Jr.

(57) ABSTRACT

An improved, load bearing, modular design container structure assembled from thermoformed FRTP sandwich panels in which is utilized the unique core-skin edge configuration of the present invention in consideration of improved load bearing performance, improved useful load volume, reduced manufacturing costs, structural weight savings, impact and damage tolerance and repair and replace issues.

8 Claims, 7 Drawing Sheets

Prior Art

MODULAR CONTAINER ASSEMBLED FROM FIBER REINFORCED THERMOPLASTIC SANDWICH PANELS

The U.S. Government has a paid-up license in this invention and the right in limited circumstances to require the patent owner to license others on reasonable terms as provided for by the terms of contract number SNL-98FI-0960820 awarded by Sandia National Laboratories under its contract with the U.S. Department of Energy.

BACKGROUND

1. Field of the Invention

The present invention relates generally to thermoforming of sandwich panels comprised of fiber reinforced thermoplastic (FRTP) skins and low-density core of a thermoplastic material, thermoformed articles made therefrom, and more particularly an assembled container structure comprised of the thermoformed FRTP sandwich panels and attachment hardware.

2. Reference to Prior Art

Container structures such as those used for land, sea and air transport of goods having multi-piece metallic constructions are known. These structures make use of monocoque designs wherein relatively thin gage sheets forming a shell are mechanically fastened to angle, hat-section, doublers or similar stiffening elements. The monocoque shell structure formed is thus load bearing through the stiffening elements. Such structures are heavy due to their basic metallic construction, the use of robust stiffening elements, and the presence of mechanical fasteners required to assemble the shell and stiffeners. As the stiffening elements of a monocoque design are typically located on the interior of the shell structure, the stiffening elements of the design limit the useful volume of the container and interfere with internal loading of such containers as do the mechanical fasteners which protrude into the container volume.

These metallic structures are also susceptible to short lifecycles due to physical damage from mis-handling and their inherent lack of damage tolerance. Additionally, corrosion damage from their exposure to a harsh environment including fluctuating temperature extremes, water, ice, oils, solvents, and salt shortens their useful life cycle. Often an entire container is replaced where only stiffening elements or shell elements are damaged rather than performing a limited repair on the damaged element due to the load-bearing capacity of the individual elements.

Fiber Reinforced Plastics (FRP) are a non-metallic, composite material of a first, reinforcing element such as fiberglass, carbon, aramid fiber or woven form thereof which is encapsulated and bound within a second, matrix element such as a cured or hardened plastic of polyester, epoxy or other resin. Structures made from FRP's benefit from the composite synergy of the two, or more, constituent elements namely higher specific strength to weight ratios of FRP over conventional metallic structures such as aluminum or steel and are thus lighter in weight. Generally, when compared to their conventional metal counterparts, FRP's show better corrosion resistance, improved impact and damage tolerance, and lower piece/part count due to the increased complexity of designs possible with FRP's. For these and other benefits, FRP's have been integrated into aerospace, automotive, recreational, and industrial applications as direct replacement for metal structures. One such example is the use of polyester-fiberglass FRP in the marine industry for ship hulls, bulkheads, and decks. A second example is the use of carbon-epoxy FRP in aerospace applications such as aircraft fuselage and flight control structures.

A first type of FRP materials incorporates a single or multiple layer of FRP material consolidated or pressed into a sheet or panel often referred to as a laminate. While exhibiting increased strength to weight performance over metallic structures, replacing metallic structures with FRP laminates has met with mixed results. The nature of their multi-constituent fiber and matrix-binder form invites separation of the constituents at the interface of fiber and matrix-binder under concentrated, high stress conditions, particularly at attachment points and impact damage from handling or adverse environment conditions. Although generally more damage tolerant than metallic structures, FRP structures do not have well defined, time-proven means of repairing local damage to insure structural integrity of the whole. The FRP laminate construction often incorporates monocoque design utilizing shell, stiffening elements, and fasteners. Thus weight and damage repair/replace issues minimize the benefits of 100% FRP.

A second type of FRP materials incorporates a sandwich construction wherein a low density core material of foam or cellular construction is sealed at its surfaces by thin layers of FRP laminate material or skins. One such core material is honeycomb, a nodal arrangement of thin walled, parallel cells comprised of aluminum, coated paper, polymeric or other material. Sandwich structure FRP's exhibit superior stiffness and high strength to weight ratios compared even to solid panels of FRP. However, like FRP laminate materials, repair of localized damage to sandwich structure to insure structural integrity of the whole is more art than science. Also, honeycomb core of aluminum or coated paper is susceptible to moisture ingression, which causes corrosion, weight increase and/or sacrifices structural integrity and performance.

The low density foam or honeycomb core also presents serious issues in mechanically attaching the FRP sandwich panel to another structure. Such core materials do not resist bearing or pull-out load well and fail under such conditions if un-reinforced. Thus, local reinforcement of the attachment area or special fastener inserts adding weight, special manufacturing steps and interposing dissimilar materials is necessitated. The dissimilar materials raises CTE and bond integrity issues of concern to the structure. Hence, manufacturing the FRP sandwich structure often requires design specific sculpting or forming of the core in consideration of panel edge core-crush as well as appropriate configuration for mechanical attachment to the sandwich panel.

The integration of FRP laminate panels and FRP sandwich panels into applications where metallic structures are replaced has met with mixed success. While light weight, stiff structures with reduced part count can be achieved, these FRP structures have their own shortcomings including: limited design configurations and reduced weight savings, particularly on (mechanical) attachment to other components; design specific, low rate manufacturing techniques for a given configuration and desired performance requirements; damage tolerance issues from stress, physical impact and environmental exposures. As with monocoque design metallic structures, the use of FRP panel and FRP sandwich panel materials in monocoque container structures often results in replacing an entire structure where only a component has been damaged or its structural integrity suspect.

SUMMARY OF THE INVENTION

In the present invention, off-the-shelf, square-edged stock sandwich panels comprised of Fiber Reinforced Thermoplastic (FRTP) resin skins and low density thermoplastic (TP) core material are selectively and controllably exposed to heat and incrementally thermoformed with the core-skin consolidated into laminate form edge or intra-panel area in consideration of subsequent mating and attachment of the FRTP sandwich panel to similarly formed FRTP sandwich panels or other structures. The exact configuration of the thermoformed area is design optimized to overcome manufacturing, assembly and in-service and structural performance shortcomings of prior art and FRP sandwich panel structures rather than simply substituting the FRTP panel for a metallic, FRP, or other non-FRTP structure.

Specifically, a localized area of the FRTP skin and core panel is thermoformed and consolidated into an article having a localized region of homogeneous thermoplastic melt. In the preferred embodiment, the localized area of panel is configured into at least three optimized designs including: an angled core transition to a radiused skin-core edge; an angled core transition to a flat, or non-radiused skin-core edge; a radiused and angled core transition to a radiused skin-core corner. The core-skin edge and corner areas so thermoformed and consolidated is comprised of the reinforcing fibers of the FRTP skins and the TP matrix-binder of both the FRTP skins and TP core. Thus, as a localized and consolidated laminate area of the sandwich panel, the homogenous melt region advantageously benefits from the increased weight ratio of TP matrix-binder to fiber due to the contribution of matrix-binder of the core as opposed to the TP matrix-binder of the FRTP skins alone. This is accomplished without removal of the original raw stock panel material and without the addition of reinforcing materials to the localized areas, rather by transforming the thermoplastic into an optimized structural form and configuration.

Further, in the present invention, an improved load-bearing container is assembled from such thermoformed FRTP sandwich panel article (components) comprised of FRTP laminate skins and low-density core of thermoplastic material. A modular sandwich panel design is utilized rather than a monocoque shell-stiffener design. The use of modular sandwich panel construction requires consideration of the design for the panel's edge closure and intra-panel area assembly points to account for fastening and assembly integration to mating components. With the inventive modular, non-moncoque design, an external load applied to the container is distributed through-out the entire container assembly rather than being concentrated in the frame (stiffening) members. This improvement further results in individual repair and replacement of damaged modular container components rather than replacement of the entire container structure.

These optimized, local area skin-core designs of the thermoformed FRTP skin and core panel result in the following improvements over the prior art:

Provide an improved load bearing point for attachment of a sandwich panel to another structure with minimal waste or removal of skin-core material and eliminates steps of removing and replacing skin and core material from the raw stock panels at attachment points;

Eliminate multiple, dedicated, configuration specific tooling for variations in final panel size and shape;

Avoid the added weight, cost, and introduction of local reinforcing materials or means to provide load bearing attachment points on an FRP sandwich panel edge or intra-panel point;

Facilitates a load bearing attachment without introduction of dissimilar CTE materials at the site of reinforcement providing structural continuity and integrity of the panel.

It is an object of the present invention to provide a method of processing standard, flat-stock, square-edge FTP skin and TP core sandwich panels such that:

An article results having localized areas which are comprised of a consolidated melt of TP matrix-binder and reinforcing fiber exhibiting improved structural and performance properties over the un-formed sandwich panel, namely improved load bearing points for attachment to the panel, improved impact and damage tolerance at edge areas, improved core crush resistance and stabilization in core thickness transition areas;

Flexible tooling is utilized to minimize cost of duplicative, specialized tooling dies and fixtures for component configuration details and to form articles in an incremental fashion;

Standard, flat-stock raw material is efficiently utilized such that removal, scrap and inventory is minimized.

It is an object of the present invention to produce an improved container structure assembly from FRTP skin and TP core sandwich panel articles processed by a thermoform and consolidation method, the container structure exhibiting:

Minimized weight due to the use of modular, FRTP sandwich panel design benefiting from minimized part-piece count, minimized quantity of (fastener) attachment means, elimination of need for localized attachment point reinforcement by addition of stabilizing potting materials or specialized fastener inserts;

Distribution of container loading to bear upon the entire modular structure rather than concentrating loads in load-bearing, monocoque components by utilizing inventive edge close-out and corner configurations for modular components resulting in improved load bearing performance at component termination points and container joints;

Improved impact resistance and damage tolerance from in service loads and environmental conditions by use of skin-core sandwich panel of TP matrix-binder composite including localized areas design optimized for load and in-service structural performance;

Facilitating repair/replacement of individual, modular components of the container assembly by eliminating load bearing "stiffening" elements via use of high stiffness to weight ratio sandwich panels versus replacement of entire container assemblies upon load-bearing component damage;

Maximized useful container volume loading due to elimination of fastener protrusion into the load volume and elimination of internal stiffening members required with monocoque structures.

DETAILED DESCRIPTION OF THE PREFERED EMBODIMENT

Figure 1:
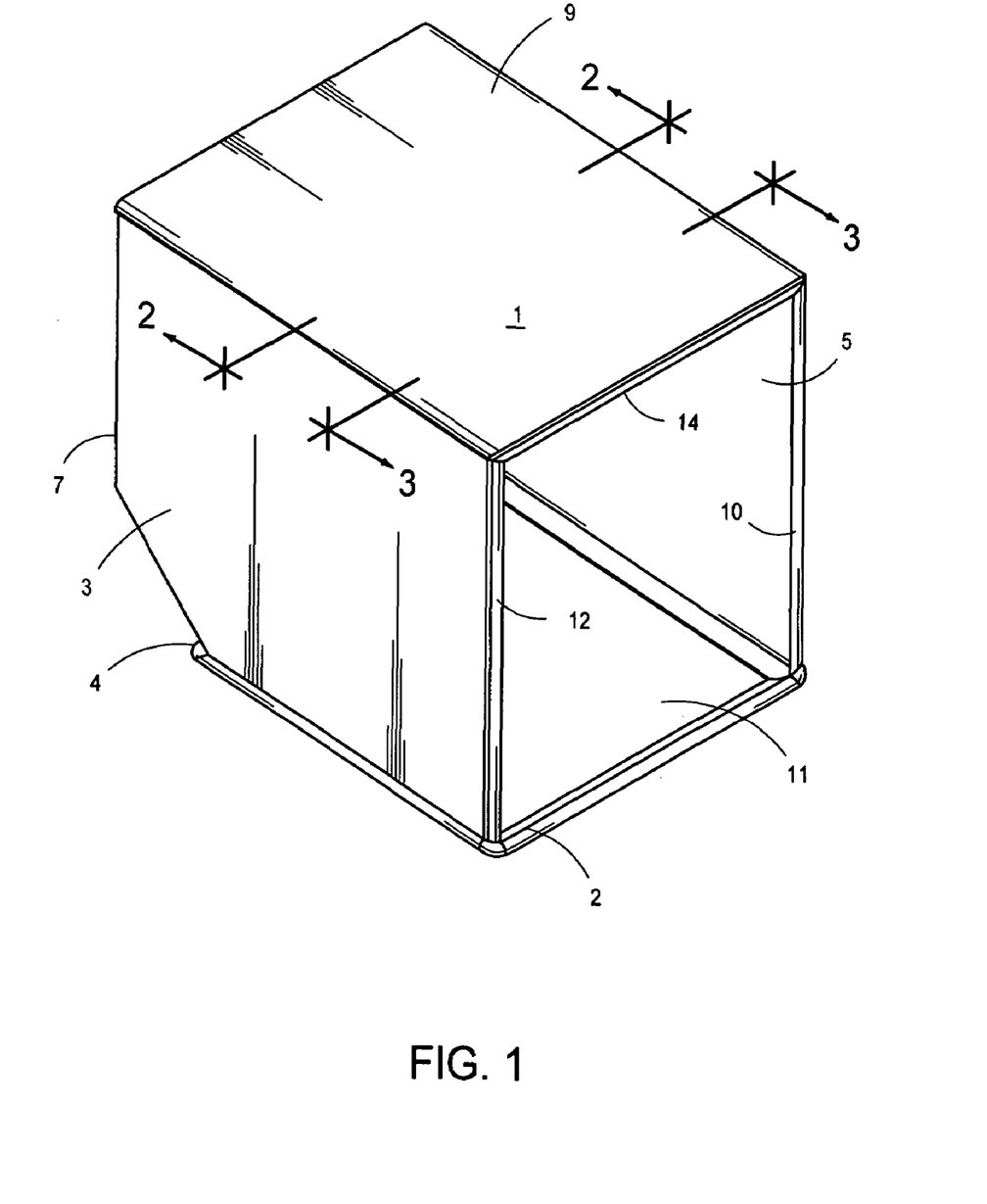
FIG. 1 is a schematic perspective view of a load bearing container assembly.

FIG. 1 illustrates a schematic perspective view of a container as may be used by example for air cargo applications. The general shape, geometry and scale of the figure is not limiting of the invention's scope or application to air cargo applications; in contrast to sea, land and intermodal containers; rather is shown to aid in the invention's disclosure. Container 1 has a forward end 2 and rearward end 4.

Container 1 further has: two vertically planar side walls 3 and 5, and rear wall 7; and horizontally planar top wall 9; base 11 and with opening 6 at forward end 2 which is framed by: base 11; elements 10, 12, 14; and the forward termination of sides 3 and 5, and top 9, opening 6 serving as an access to the interior of the container. Elements 10, 12 and 14 serve as hardware framing members at opening 6 at the forward termination of walls 3, 5 and 9.

In the inventive embodiment of container 1, walls 3, 5, 7 and 9 are sandwich panels constructed of Fiber Reinforced Thermoplastic (FRTP) skins and low-density core of thermoplastic material. Base 11 is comprised of plate 13, which is framed with edge rails 15. In a further embodiment, container 1 is comprised of four side walls 3, 5, 7, and 8 wherein side wall 8 is at forward end 2 and is fitted with opening 6 rather than opening 6 being framed by adjacent elements 3, 5, 9 and 11 as described previously.

Figure 2:
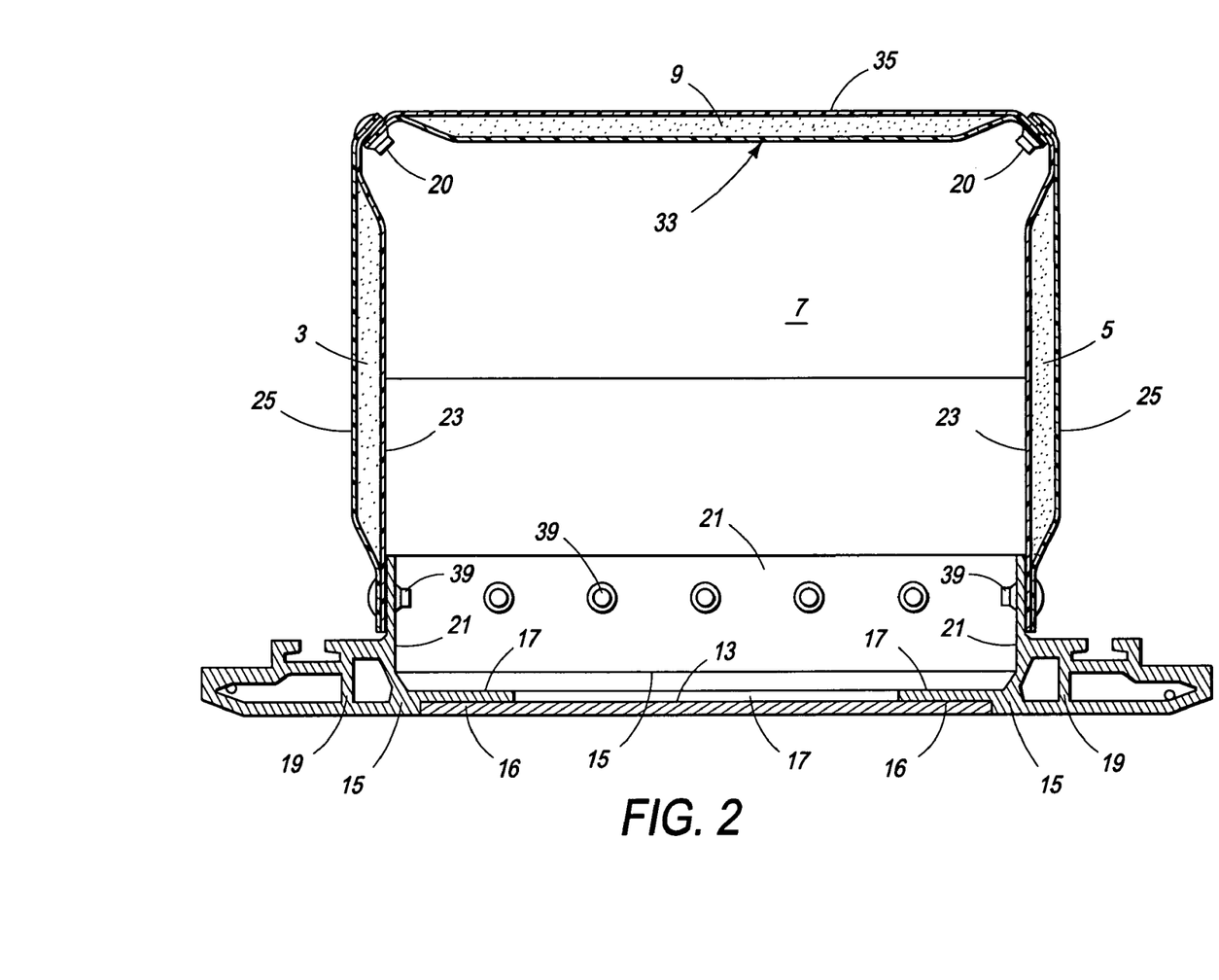
FIG. 2 is a rearward looking cross-sectional view of the container assembly.
Figure 3:
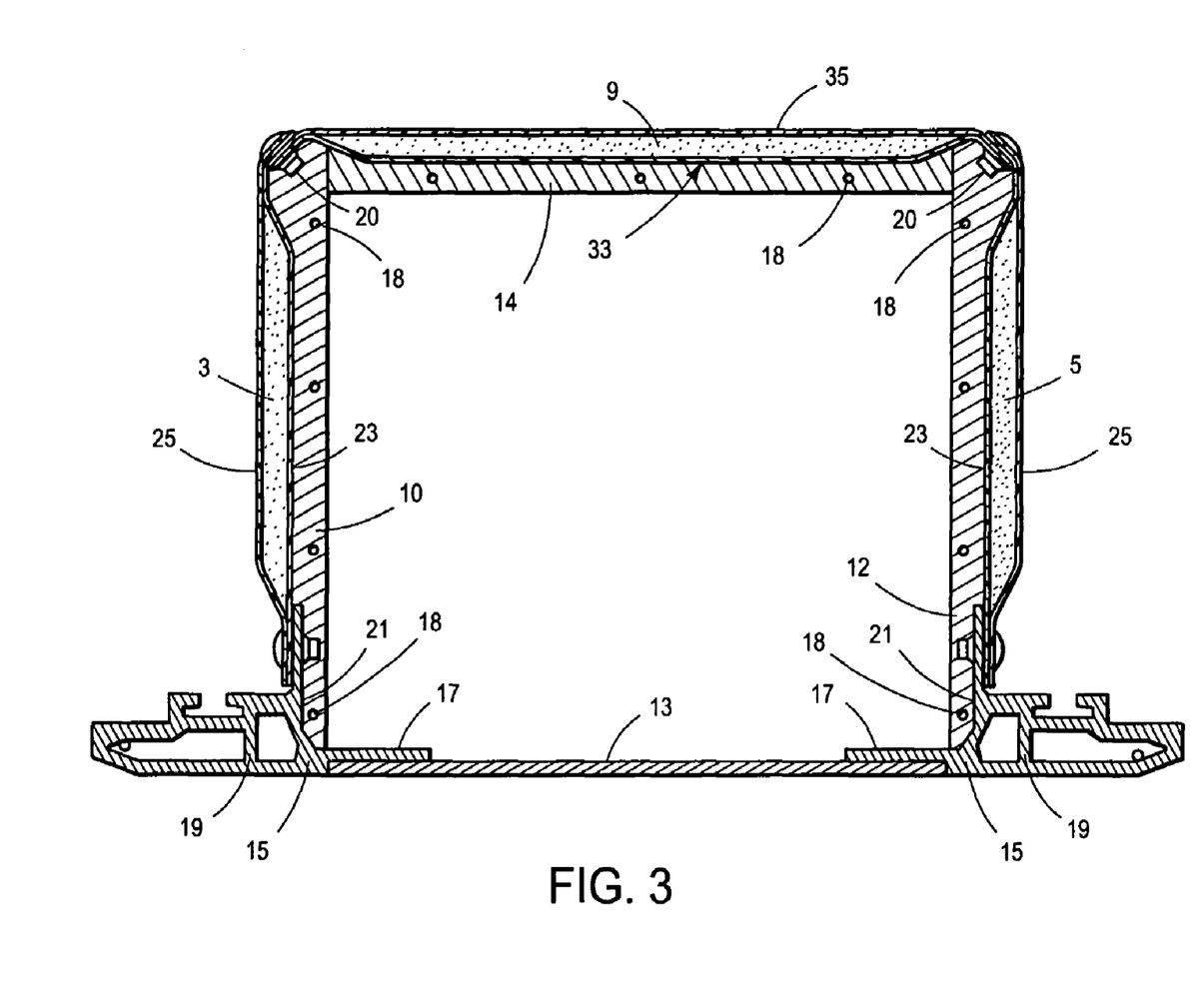
FIG. 3 is a forward-looking cross-sectional view of the container assembly.

FIG. 2 shows rearward looking cross section view of container 1 wherein only the details of sandwich constructed side walls 3 and 5 and top 9 can be seen as well as the base 11 components 13 and 15. FIG. 3 shows a forward looking cross section view of container 1 wherein details of sandwich panel constructed side wall 3, 5 and top 9 can be seen as well as the base 11 components 13 and 15 and framing members 10, 12, 14.

Edge rail 15 is located in three places at the rearward and side periphery of plate 13 thereby framing three sides of plate 13 except at forward end 2. Each edge rail 15 is further comprised of inner horizontal leg 17, outer horizontal leg 19 and vertical leg 21. Plate 13 and edge rails 15, and framing members 10, 12, 14 can be comprised of any suitable material which will perform and function in the necessary structural manner. In the preferred embodiment, plate 13 is an aluminum sheet, edge rails 15 are structural aluminum extrusions, and framing members 10, 12, and 14 are aluminum angles.

Plate 13 is fixedly attached at its periphery to edge rail 15's inner horizontal leg 17 by attachment means 16. Similarly, framing members 10, 12 and 14 are fixedly attached at their point of contact with plate 13 and forward end of walls 3, 5 and 9 by attachment means 18. Attachment means 16 and 18 may be any appropriate means known to the industry including but not limited to interference fit, slip fit, nut-bolt, riveting, adhesive bond or equivalent means. In the preferred embodiment, attachment means 16 and 18 are mechanical fastening means.

In an alternative embodiment of base 11, rather than being comprised of four separate elements, plate 13 and one, two, or three of edge rails 15 comprise a single element thereby reducing or eliminating means 16 as appropriate to the number of edge rail elements.

Side walls 3 and 5, and rear wall 7 are further comprised of inner skin 23, outer skin 25, core 27, lower edge 29, radiused upper edge 31, and radiused side edges 32. Top wall 9 is further comprised of inner skin 33, outer skin 35, core 27 and radiused periphery edges 37.

Referring to FIGS. 2 and 3, it can be seen that walls 3, 5, and 7 are joined to respective edge rails 15 by attachment means 39 through the respective mated portions of the side wall's lower edges 29 and edge rail 15's vertical leg 21. Attachment means 39 is dispensed along the length of leg 21 and edge 29. Attachment means 20 joins periphery edge 37 of top wall 9 to upper edge 31 of walls 3, 5, and 7 and joins walls 3, 5, 7 at the juncture of each respective wall's side edge 32. Means 39 and 20 may be any appropriate means known to the industry including but not limited to nut-bolt, rivet, adhesive bond or equivalent means. In the preferred embodiment, a mechanical fastening means is used.

Attention is drawn to FIGS. 2 and 3 to illustrate that where means 20 is a mechanical fastener, the configuration of radiused edges 31, 32, and 37 insures that means 20 does not extend beyond the thickness of panels 3, 5, 7, or 9 and does not protrude into the inner loading volume of container 1.

The use of sandwich panel construction, particularly with FRTP, for walls 3, 5, 7, 9 in a load bearing structure requires consideration of the panel's edge close out and intra-panel area attachment points to accommodate attachment means 18, 39 and 20. The compressive strength of a sandwich panel through its thickness will vary with the density of the core material and is typically too low to accommodate attachment means such as fasteners without local reinforcement at the attachment point.

In a first prior art scenario, in an attempt to address edge and intra-panel area attachment issues, the FRP industry practice has been to locally increase compressive strength of the sandwich panel at its edge or within the panel's area by adding foam or paste type potting materials which become rigid or to add local fastener inserts. These and other methods of increasing compressive strength adds weight and cost to the sandwich panel and structure.

Figure 4:
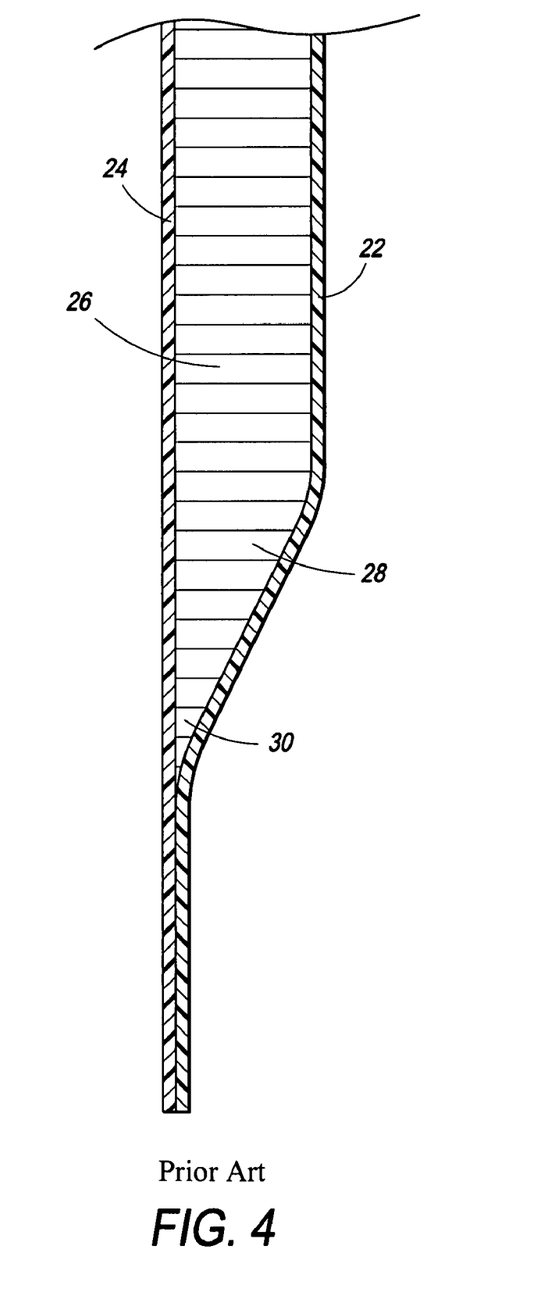
FIG. 4 is a cross section view of a prior art sandwich panel construction.

In a second prior art scenario, FIG. 4, the FRP industry extensively machines, sculpts or otherwise modifies the core material (26) at the panel's edge or at its intra-panel area before fixing the skins (22,24) such that the core material (26) is beveled at an angle through its thickness to a termination point (30) and the upper (22) and lower (24) skins are subsequently fixed to the core. Upon fixing the lower skin (24) to the core, the upper skin (22) is conformed to the core bevel geometry (28) and the upper and lower skins are extended beyond the core's termination point (30) such that a suitably thick attachment flange is formed at the edge of the panel by the extended upper (22) and lower (24) skins. This approach does not allow cost efficient, high rate manufacturing as the beveled edge is not amenable to manufacturing processes such as flat platen press or molding and requires considerable hand labor.

The preceding scenario requires component and configuration specific tooling since core material is manufactured to constant thickness cross-section. Such configuration specific, custom tooling is expensive to manufacture and inventory. Additionally, the now beveled core still requires stabilizing with a reinforcing foam or paste along its bevel length. This is required to prevent the core from crushing (core-crush) as the outer skin is applied, consolidated and processed to completion. Such core stabilizing adds weight and cost.

In yet another prior art scenario, the core is beveled after the upper and lower skins are fixed to the constant cross-section core necessitating removing one skin and detail machining the core's edge to a transition bevel. A replacement skin is fixed to the core bevel geometry to replace the removed skin and a robust attachment flange is formed at the edge of the panel by the extended upper and lower skins. While configuration specific tooling is avoided, costly custom manufacturing techniques are needed to remove skin and core, to replace and consolidate skin.

Prior art attempts at addressing sandwich panel attachment issues has required removal and waste of skin/core material; necessitated adding dissimilar reinforcing materials to the site; increased manufacturing time, cost and weight to the sandwich panel and thus assembled structures. Additionally, the modified panel structure and dissimilar materials now presented at the modification or fastener point invite cracking and separation or de-bonding of (plastic) matrix-binder materials due to differing material's coefficients of thermal expansion (CTE) and surface seal integrity (migration path into structure for moisture, oils, solvents, dirt) which both reduce aesthetics and structural integrity and which in turn increase maintenance and repair costs of the component and assembly.

In the present invention, the improved load bearing container addresses panel edge and intra-panel attachment issues of sandwich panel construction without the need for potting, fastener inserts, component specific tooling, or custom modification techniques, minimal material removal and waste; nor the introduction of dissimilar materials into the panel.

The invention utilizes Fiber Reinforced Thermoplastic (FRTP) skins and thermoplastic (TP) core to construct the sandwich panel. The sandwich panel edge, or an intra-panel area, is selectively and controllably exposed to heat and forming pressure (thermoformed) to soften and angularly collapse the panel's cross-section thickness including the core material, deform the FRTP skins, and form a consolidated, homogenous melt of core-skin of robust design configuration desired for the panel's subsequent attachment to a mating component. The core-skin so thermoformed and consolidated is now comprised of the reinforcing fibers of the skins and the TP matrix-binder of both the FRTP skins and the TP core. Therefore the weight ratio of the matrix-binder to reinforcing fibers in this consolidated area is greater as opposed to the ratio in the FRTP skins alone. Thus, the thermoformed area is optimized for fastener attachment and load-bearing performance utilizing a melt of homogeneous materials or materials closely matched for CTE and related properties.

The thermoforming of the skins and core into a consolidated, homogenous melt is possible because the thermoplastic resin of the FRTP matrix material and TP core material softens as it is exposed to its molecular specific melt temperature. The thermoplastic is advantageously deformable under pressure (thermoformed) within a range of temperatures at the thermoplastic's specific melt temperature. This temperature range is referred to as the processing window of the specific thermoplastic. When cooled below the lower limit of the processing window, the thermoplastic becomes rigid and will hold the deformed shape.

Any of a wide variety of thermoplastic resins can be used as the matrix of the FRTP and core materials as seen in Table I below. The reinforcement of the FRTP may be continuous or discontinuous fibers or a textile fabric form thereof including fiberglass, aramid, carbon, nylon, polyester, polyolefin or similar materials.

TABLE 1

| Thermoplastic Material | Processing Temperature Window | |
|---|---|---|
| | (DEG C.) | (DEG F.) |
| ABS | 180–240 | 356–464 |
| Acetyl | 185–225 | 365–437 |
| Acrylic | 180–250 | 356–482 |
| Nylon | 260–290 | 500–554 |
| Polycarbonate | 280–310 | 536–590 |
| LDPE | 160–240 | 320–464 |
| HDPE | 200–280 | 392–536 |
| Polypropylene | 200–300 | 392–572 |
| Polystyrene | 180–260 | 356–500 |
| PVC, rigid | 160–180 | 320–365 |

In the preferred embodiment, the FRTP skin panels are comprised of fiberglass fibers coated with polypropylene or commingled with polypropylene fibers in fixed proportions and woven into a textile fabric form. A commercially available form of this product is TWINTEX ® available from Vetrotex America. When heated to the melt processing range and formed between platens and subsequently cooled, Twintex forms a sheet material which is marked by thermoplastic resin matrix encapsulating the fiberglass woven form in a fully consolidated medium containing from 40 to 80% by weight fiberglass to matrix-binder ratio as desired. The skin panel may be a single layer or a multiple layer, consolidated laminate. Once formed, it can be re-heated and cooled to form a secondary shape or further thermoformed to other thermoplastic materials.

The invention's thermoplastic material of the core may take the form of low density foam, expanded foam or a parallel cellular node pattern or honeycomb structure and may itself be reinforced with any of the enumerated fibers. While the thermoplastic of the core is preferably the same thermoplastic matrix of the FRTP skin, dissimilar yet compatibly processed thermoplastics may be used for skin and core. The FRTP skins may be fixed to the core utilizing a bonding or melt film between the components or may be thermally fused.

In the preferred embodiment, the thermoplastic core material is made from un-reinforced polypropylene thermoplastic resin in a parallel cellular node pattern or honeycomb structure. The polypropylene core is fixed to the polypropylene fiberglass FRTP skin panels by a thermal fusing process. The thickness of the FRTP skins may be in the range of 0.005 to 2 inches, the TP core thickness in the range of 0.050 to 10 inches, and hence the overall thickness of the sandwich panel can vary in the range of $\frac{1}{16}$ of an inch to upwards of 14 inches.

In the preferred embodiment, the sandwich panels of the invention are: in the overall thickness range of 0.25 inches and 1 inch with the FRTP skins being comprised of a single or multiple layers in the range of 0.010 to 0.080 inch thick each. Additionally, cured and consolidated FRTP skin panels contain by weight a glass fiber to matrix-binder ratio of 50-75% and a honeycomb core density of 5-8 pounds per cubic foot. The FRTP skin-TP core sandwich panel is made into a square-edged, rectangular panel of constant cross-section thickness wherein initial tooling requirements and costs are minimized.

Three thermoformed sandwich panel article configurations will be illustrated herein in detail. There is considerable design freedom in forming of the FRTP sandwich panel which results in many design configurations suitable for general or specific attachment and load bearing conditions. For instance, the thickness, length, width, and area formed and intended to be the fastener attach point can be varied depending upon load conditions, thickness of FRTP skins, weight ratio of fiber to matrix-binder, thickness and density of core, attachment means geometry, etc. Thus, the inventive process is capable of, and applicable to, a wide range of thermoformed design and configurations beyond these three illustrated article configurations.

Figure 5A:
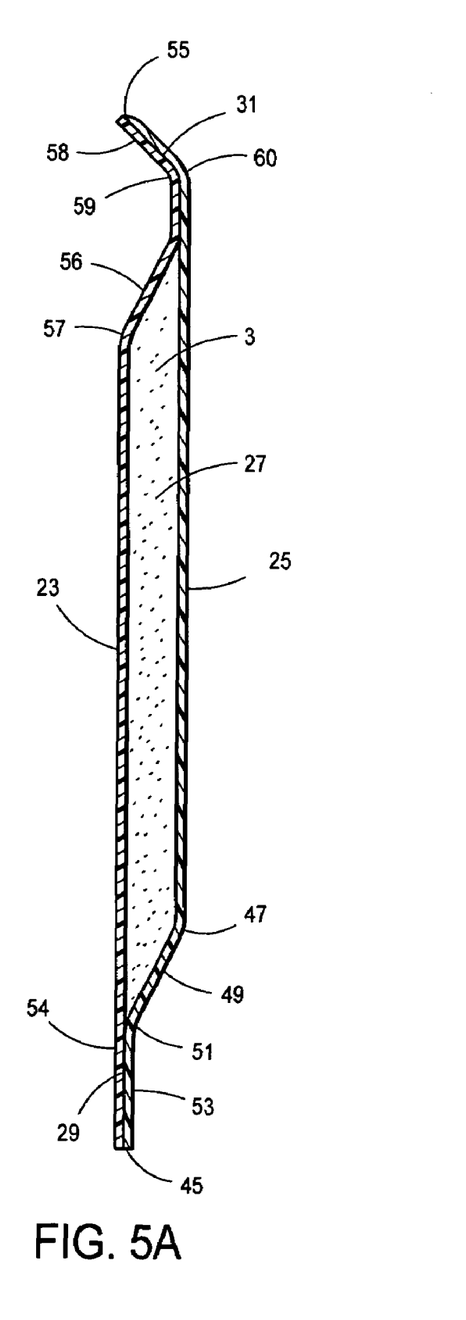
FIG. 5A is an enlarged cross-sectional view illustrative of the construction of side wall panels.
Figure 5B:
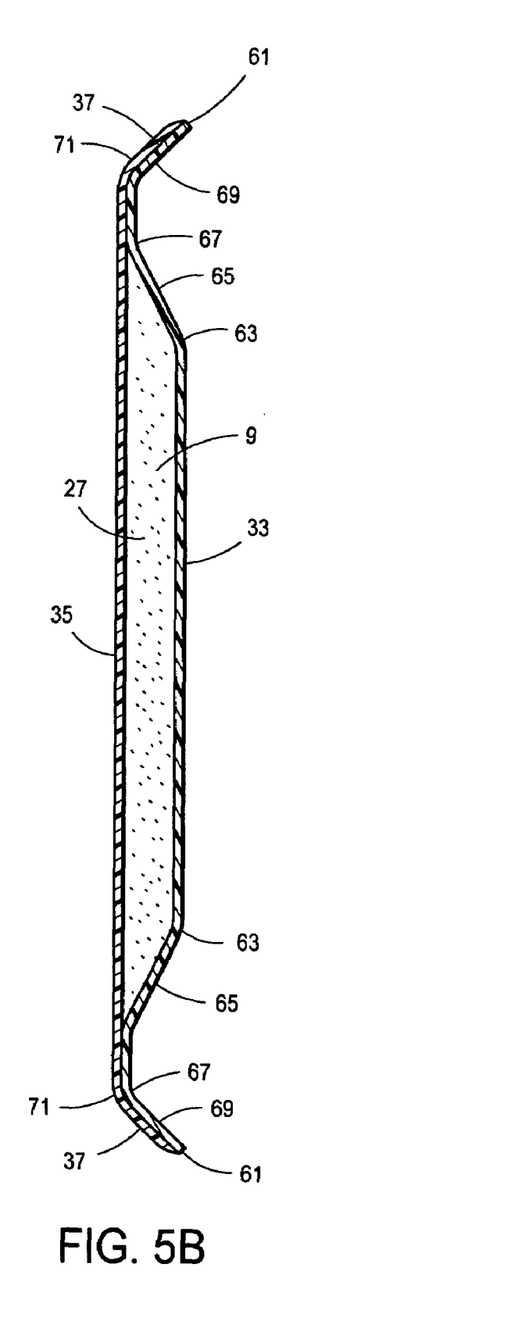
FIG. 5B is an enlarged cross-sectional view illustrative of the construction of top wall panels.

These three configurations are illustrated in FIGS. 5A and 5B and further in FIGS. 7A, 7B, and are discussed below. These thermoformed design configurations are namely: (1) common configured radiused upper edge 31, radiused side edge 32, and radiused periphery edge 37 (referred to herein as the forty-five degree edges); (2) lower edge 29 (referred to herein as the duck-bill edge); (3) and radiused corner 38. Each configuration is carefully designed for optimal component and system performance and the configuration achieved through the inventive thermoforming process. Each configuration's detailed elements will be reviewed prior to discussing the forming process.

FIG. 5A is an enlarged view illustrative of the construction of walls 3, 5 and 7 and showing lower edge 29 and radiused upper edge 31. These edges are representative of the desired configurations for the sandwich panel's thermoformed edges and are shown in further detail. Inner skin 23, outer skin 25, core 27; lower edge 29 and upper edge 31 are shown as in FIG. 2.

At lower edge 29, each of walls 3, 5 and 7 are further comprised of a lower trim end 45, duckbill bevel end 47, duckbill bevel transition skin 49, duckbill bevel start 51, inner duckbill edge skin 53, outer duckbill edge skin 54. Transition skin 49 is a sub-length of inner skin 23 and spans from bevel start 51 to bevel end 47. Inner edge skin 53 is a sub-length of inner skin 23 and spans from bevel start 51 to trim end 45. Outer edge skin 54 is a sub-length of outer skin 25 and spans from bevel start 51 to trim end 45.

At upper edge 31, each of walls 3, 5 and 7 are further comprised of upper trim end 55, forty-five degree bevel end 57, forty-five degree bevel transition skin 56, forty-five degree bevel start 59, inner forty-five degree edge skin 58, outer forty-five degree skin 60. Transition skin 56 is a sub-length of inner skin 23 and spans from bevel end 57 to bevel start 59. Inner edge skin 58 is a sub-length of inner skin 23 and spans from bevel start 59 to trim end 55. Outer edge skin 60 is a sub-length of outer skin 25 and spans from bevel start 59 to trim end 55. The design details of upper edge 31 are identical for side edge 32 of wall 3, 5 and 7, namely bevel end 57, skin 56, and bevel start 59, inner skin 58, outer skin 60. Side edge 32, not shown, is off-set at ninety degrees and perpendicular to upper edge 31 at both the forward and rearward end of walls 3 and 5, and at the left and right ends of wall 7 which are adjacent to walls 3 and 5 in FIGS. 1, 2, 3.

FIG. 5B is an enlarged view illustrative of top wall 9 and showing radiused periphery edges 37. The sandwich panel's thermoformed edges are shown in further detail. Inner skin 33, outer skin 35, core 27, and radiused periphery edges 37 are shown as in FIG. 3.

At periphery edge 37, top wall 9 is further comprised of trim ends 61, bevel end 63, transition skin 65, bevel start 67, inner edge skin 69, and outer edge skin 71. Transition skin 65 is a sub-length of inner skin 33 and spans from bevel end 63 to bevel start 67. Inner edge skin 69 is a sub-length of inner skin 33 and spans from bevel start 67 to trim end 61. Outer edge skin 71 is a sub-length of outer skin 35 and spans from bevel start 67 to trim end 61. This periphery edge 37 and its detailed elements comprise the periphery of wall 9, i.e. all four sides of wall 9.

Figure 7A:
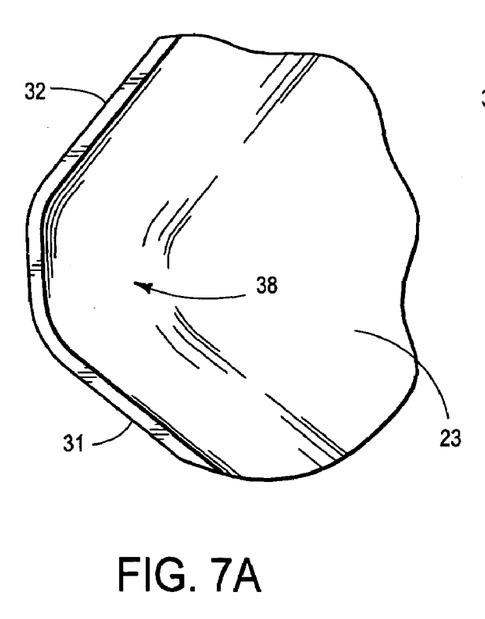
FIG. 7A is an inner plan view of a container wall illustrating the formed, radiused corner at the juncture of perpendicular edges.
Figure 7B:
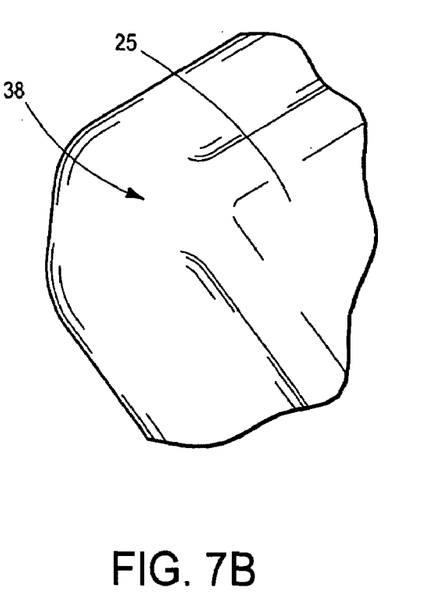
FIG. 7B is an outer plan view of a container wall illustrating the formed radiused corner at the juncture of perpendicular edges.
Figure 7C:
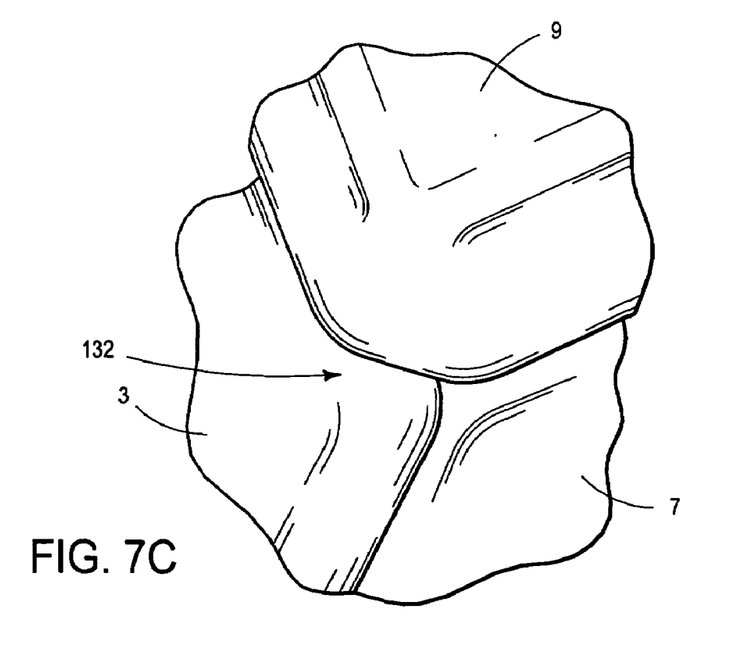
FIG. 7C is a perspective view of the juncture of two-side walls and top wall forming a corner of the container.

FIGS. 7A, 7B and 7C are plan views of radiused corner 38 which is common to walls 3, 5, 7 and 9. Radiused corner 38 is formed at: the perpendicular juncture of upper edge 31 and side edges 32 of walls 3 and 7; the perpendicular juncture of upper edge 31 and side edge 32 of walls 5 and 7; and at the juncture of perpendicular periphery edges 37 of wall 9.

The present invention utilizes an inventive thermoforming process to configure a standard, flat-stock, square-edged, rectangular sandwich panel of constant cross section and thickness into the detailed sandwich panel core-skin edge closeouts 29, 31, 32, 37 illustrated in FIGS. 5A and 5B and to form radiused corner 38 illustrated in FIGS. 7A and 7B. This is accomplished with minimal tooling and manufacturing cost, minimal raw material waste, and utilizes non-dissimilar, thermally compatible materials throughout the component's cross section.

The resulting thermoplastic sandwich panel exhibits: superior impact resistance and damage tolerance, reformability of edge details, offers modular remove and replace repair strategies and flat stacking/shipping of finish-formed components. Further, the sandwich panels with core-skin edge close outs so formed and depicted may be assembled in a modular fashion into a container structure such as described and illustrated in the preceding disclosure. Integration of such panels in a modular fashion result in assembled container structure benefits including: reduced piecepart/fastener count; structural load distribution across the structure versus concentrated load bearing by components; improved sealing of the assembly from the environment; maximizing container volume for cargo by eliminating inner stiffening members and recessing fasteners from protrusion into cargo volume.

Thermoforming of the square-edge sandwich panel to melt and collapse the core material and reform the melt with that of the fixed skins is achieved by heating the sandwich panel material to the heat processing temperature range and forming the final desired shape under compression followed by cooling and hardening of the melt while retaining the shape. In this process, the FRPT sandwich panel is selectively and controllably exposed to heat and forming pressure thereby allowing deformation of both the FRTP skin and underlying core material in a precise and incremental fashion.

The application of heat energy to the sandwich panel can be accomplished through radiant, conductive or other heating means. In the preferred embodiment, conductive heating provides a selectively, controlled melt process. The greatest amount of heat is applied to locations requiring the most deformation.

Figure 6A:
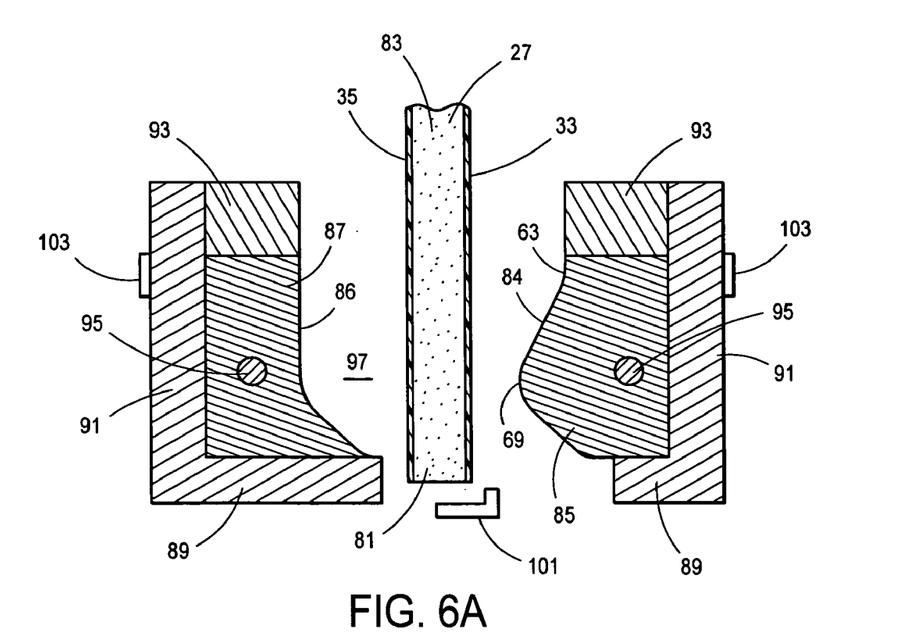
FIG. 6A is an illustration of thermoforming a radiused edge configuration in a FRTP sandwich panel.

Attention is drawn to FIG. 6A illustrating forming of the core-skin edge configuration of top wall 9 at radiused periphery edge 37 wherein the core 27 and skins 33, 35 will be thermoformed from bevel start 67 to bevel end 63. This illustration is identical for forming radiused edge 31 and 32 of walls 3, 5, and 7.

Conductive heating at end 81 of constant cross section, square-edged, rectangular FRTP skin-TP core sandwich panel 83 is accomplished by contact-melting with a heated set of matched male die 85 and matched female die 87 of the desired configuration. The dies 85 and 87 are exposed on those surfaces 84 and 86 which are intended to come into contact with the sandwich panel 83. The dies have insulated elements 89, 91 and 93 in areas that are not intended to come in contact with or to form the thermoplastic. Insulation element 93 at the upper end of the dies serves as a forming stop, which prevents melting under pressure past the core bevel end 63. The insulated elements and heated elements of the dies, coupled with an appropriate means 103 to force them into the panel, allows for selective and controllably exposing the FRTP panel to the thermoplastic's optimal process temperature.

The thermoforming process illustrated here proceeds as follows:

Heating means 95 in dies 85 and 87 brings each die half to the desired temperature in the thermoplastic's melt processing range. Dies 85 and 87 are opened, panel 83 is inserted into the die cavity space 97 and positioned to the desired depth and transverse location and held by registration means 101.

Modest, controlled and gradient pressure in the range of less than 1 to several hundred pounds per square inch (PSI) is applied from means 103 forcing heated dies 85 and 87 into space 97 and compressing FRTP skins 33 and 35 toward the mid-plane of panel 83. Increased, controlled gradient heat and pressure is applied along the area of contact with the thermoplastic matrix skins wherein the thermoplastic material begins to soften as it approaches its melt temperature. This further, controlled and gradient heat and compression (pressure) on the skins and core causes the core to melt, give way and collapse within the two FRTP skins. This melt of FRTP skin and TP core is further consolidated under increased pressure from means 103 and forming the final core-skin edge configuration. Once the melt and consolidation of skin and core of panel 83 is complete, die 85 and 87 are retracted away from space 97 and panel 83.

Referring to FIGS. 6A and 5B, it can be seen that skin 33 is formed along its length by die 85 from bevel start 67 to bevel end 63, this length of skin 33 referred to as transition skin 65. Skin 33 is also formed along its length by die 85 at bevel start 67 to its termination at trim end 61, this length of skin 33 referred to as inner edge skin 69. Similarly, outer skin 35 is formed from bevel start 67 to trim end 61, this length of skin 35 referred to as outer edge skin 71.

The melt of thermoplastic in the FRTP skin 33 along its skin lengths 65 and 69 and the melt of thermoplastic in skin 35 along its skin length 71 interacts with the melt of thermoplastic in the core 27 along their respective, common surfaces or interfaces. Dependant upon the compatibility of the thermoplastic (TP) material of the skins and core and the thermoforming temperatures and pressures, this interaction will vary from a region of enhanced (TP) melt -to- (TP) melt adhesion or bond at this interface to a region of indiscernible interface or commingling between thermoplastic melt of skin and core.

It is found that an enhanced melt-to-melt adhesion interface is dominant from the point of bevel end 63 to bevel start 67 along transition skin 65 of 33 and core 27 whereas an indiscernible interface or commingling of core-skin thermoplastics is dominant from the point of bevel end 67 to trim end 61 along the inner edge skin 69 and outer edge skin 71. In the indiscernible interface region, the commingled melt of core thermoplastic with skin thermoplastic raises the weight ratio of thermoplastic matrix-binder to reinforcing fiber (oppositely, the weight ratio of fiber to matrix decreases) as compared to the weight ratio of matrix-binder to fiber in each of skins 33 and 35 alone as in the un-thermoformed areas of panel 83.

The increased weight of matrix-binder contributes to this core-skin edge being less stiff and more flexible than the un-formed panel area due to the nature of thermoplastic materials which in-turn improves impact and damage tolerance of the edge. The contribution of thermoplastic matrix-binder from the core to this consolidated edge area also improves interlaminar shear of the consolidated skins 33 and 35 by providing additional matrix to maintain adherence of the separate skins and their fiber under loading which concentrates stress between their interface. Additionally, the enhanced melt-to-melt adhesion at the interface between transition skin 65 and core 27 improves resistance to loading and core-crush along the thermoformed core bevel transition without the addition of stabilizing materials.

The characteristics of the melt interfaces and the associated benefits illustrated for edge 37 will be identical for core-skin edge configurations other than radiused periphery edge 37 including edges 29, 31, 32 and radiused corner 38 as well as intra-panel core-skin configurations and other configurations that are possible with the inventive thermoform process for FRTP skin-TP core sandwich panels.

Thermal melt and collapse of the core in conjunction with compression of the melt zone during forming can easily result in bunching up of the FRTP skin fiber on one side of the radiused periphery edge 37 unless proper attention is paid in the formed joint design. Two factors must be controlled in minimizing FRTP skin fiber bunching of wall 9: (1) maintaining an exterior path length which is approximately equal for inner edge skin 69 and outer edge skin 71, and (2) use of radii from bevel start 67 to trim end 61 which are large relative to the thickness of the joint and on size with the combined skin-core-skin thickness of the FRTP sandwich panel being formed. In this manner, the total average slip of the skins 33 and 35 being formed, as measured by the off-set of each skin relative to each other at trim end 61, is negligible as opposed to having one skin slide during forming past the other a dis-proportionate length.

Dies 85 and 87 may be of any length, width and travel as appropriate for the desired formed configuration and panel size or area. Die halves may be heated by any suitable means 95. The dies are forced under pressure into the surface of the sandwich panel to form a low temperature melt by any appropriate means 103 producing from less than 1 to several hundred PSI. A mold release, not shown, may be used on the die halves or a release film, not shown, on the outer skin surfaces of panel 83 to prevent sticking of the molten thermoplastic onto the tooling. Controlled melting and cooling can be achieved by processing at the lower end of the processing windows of Table 1 for a given thermoplastic material.

Figure 6B:
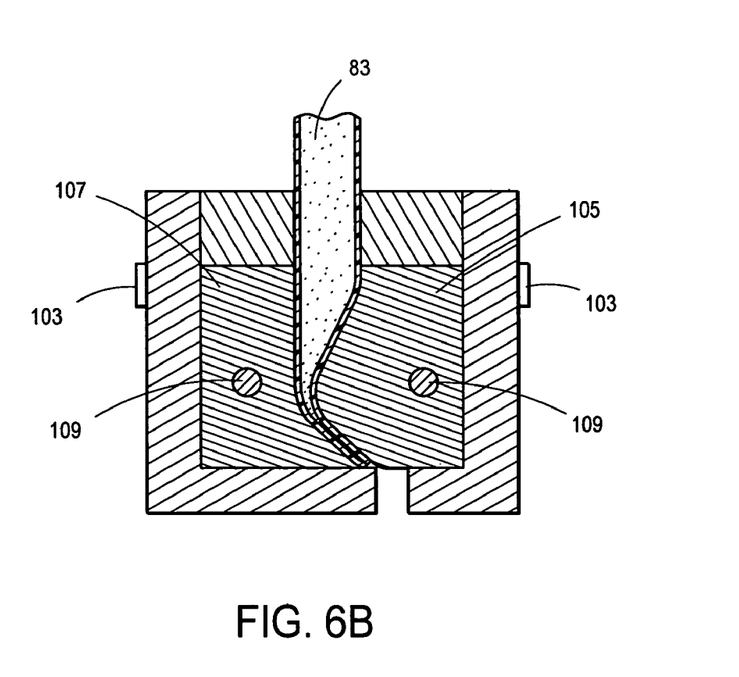
FIG. 6B is an illustration of the further forming and cooling of the radiused edge configuration.

Referring to FIG. 6B, once the heated dies 85 and 87 are fully retracted, a cold set of matched dies 105 and 107 are moved into position and forced into the melt zone of thermoformed panel 83 by means 103 to cool the part below its lower specific thermoforming process temperature window. Dies 105 and 107 may be at ambient temperature or cooled by means 109 depending upon the temperature required to bring the thermoplastic below its softening temperature to retain its formed shape.

Heated die sets and cold die sets may be sized to form the entire final edge length of any component such as edge 37 of wall 9. In the preferred embodiment, the die sets are sized to form only a partial length of the final edge length of a component. In this way, thermoforming and cooling of a component's edge is achieved incrementally rather than in one step. This incremental approach is desirable particularly at the juncture of any perpendicular edges of a component. Whether a component's edge length is formed in one step or incrementally, the remaining periphery of a component is formed by re-positioning and indexing the panel into the (desired) heated and cold forming dies. For instance, a square shaped component will have one of it's side edges formed as illustrated, be re-positioned and indexed at 90 degrees for a second side, and re-positioned so forth until the panel's entire periphery has been formed as desired.

The thermoforming process; described for the periphery edge 37 of wall 9 resulting in the forty-five degree edge configuration and illustrated in FIGS. 6A and 6B; is similarly applied to a square edged, constant cross section, rectangular FRTP sandwich panel to thermoform the forty-five degree core-skin edge configuration for radiused upper edge 31 and radiused side edge 32 of walls 3, 5 and 7 and illustrated in FIG. 5A.

The core-skin edge configuration of lower edge 29 of walls 3, 5 and 7 is similarly formed by thermoforming a rectangular, constant cross-section, square edged FRTP sandwich panel as described in the preceding paragraphs. The flat ended, or duck billed edge details of lower edge 29 are shown in FIG. 5A. To thermoform a sandwich panel core-skin edge of this configuration, a heated matched male-female tool set and cooled male-female tool set designed to this duck billed configuration, rather than the radiused forty-five degree configuration, are required. Similarly, these dies for the duck bill configuration require insulated sections where heat (forming) is not intended to come into contact with the finished part. Here again, intended exposure of the un-formed FRTP panel to heat and forming pressure is selective and controlled.

The specifics of the tooling and processing required for the duck bill or flat edged panel thermoforming is comparable to that required for the radiussed edge thermoforming. However, it should be noted that the lengths of inner edge skin 49 and outer edge skin 54 will be more closely matched during and after thermoforming than those of elements 69 and 71. Thus bunching up of FRTP skin at the forming point is less an issue than in forming the forty five-degree radiused edge. Here, similar to the forty-five degree configuration, skin 25 is formed along its length from bevel start 51 to bevel end 47, referred to as transition skin 49, and formed along skin 25's length from bevel start 51 to trim end 45, referred to as inner edge skin 53. Also, skin 23 is formed along its length from bevel start 51 to trim end 45, referred to as outer edge skin 54.

As shown in FIGS. 7A and 7B, a radiused corner 38 is formed within walls 3, 5 and 7 where radiused upper edge 31 meets perpendicular, radiused side edge 32. Radiused corner 38 is formed at both the forward and rearward points of upper edge 31 meeting side edge 32 for both walls 3 and 5. Radiused corner 38 is formed in panel 7 where top edge 31 meets side edge 32 at their points of contact with walls 3 and 5. Radius corner 38 is concave at the surface of inner skin 23 and convex at the surface of outer skin 25. Tracing the perimeter of wall 3, 5 or 7, as edge 31 terminates, radiused corner 38 begins and sweeps a radius about an angle of ninety degrees until radiused corner 38 meets the termination point of perpendicular edge 32.

Similarly, radiused corner 38 is formed where each of the four periphery edges 37 of top wall 9 meet an adjacent, perpendicular edge 37. Here, radiused corner 38 is concave on the inner skin 33 of wall 9 and convex on the outer skin 35 of wall 9. As one edge 37 of wall 9 terminates, radiused corner 38 begins and sweeps ninety degrees until it meets the termination point of an adjacent, perpendicular edge 37. Thus, radiused corner 38 is formed in ten places for container assembly 1: in two places in each of walls 3, 5, and 7; and in four places in wall 9.

Thermoforming of FRTP skin and TP core into configuration of radiused corner 38 is achieved in at least two ways. First, a heated die set similar to 85 and 87 and cold die set similar to 105 and 107 are configured to the specific design details of radiused corner 38. The die set is designed to the final desired concave (inner) and convex (outer) surface dimensions of radiused corner 38 and take into account all skin and core forming in the 90 degree arc of any radiused corner 38. The heated dies are employed to selectively and controllably expose the FRTP skins and TP core to heat and pressure to soften and collapse the core within the skins and thereby thermoform the raw FRTP skin-core stock in a single step to the desired final configuration.

Second, and the preferred embodiment, a heated die set and cold die set are sized to a sub-length of the inner and outer dimensions desired for corner 38 along its sweep angle of ninety degrees from edge termination to edge termination thus forming the corner incrementally. The radiused corner 38 may be formed into the sandwich panel either before or after forming the adjacent wall edges 29, 31, 32 or 37 described previously. The inventive process for thermoforming the FRTP skin TP core sandwich panel is employed wherein the panel's corner location is positioned and held in the desired position by index 101 between heated die halves. The skin and core in the area to be formed are selectively and controllably exposed to heat and pressure to soften and collapse the TP core between the FRTP skins along the incremental radial length of corner 38. Upon cooling the thermoformed length, the panel is re-positioned to index 101 between die halves to form the next incremental length of corner 38. This process is repeated until the entire radial length of corner 38 is formed along its ninety degree sweep.

The improvements over the prior art which the configuration of radiused edge elements 31, 32 and 37 and radiused corner 38 present include the following:

(1) a compact nested joint is formed at the two wall juncture of the 3, 5 and 7 walls such that a ninety-degree joint can be formed from any two such formed panels wherein load bearing performance and load distribution is improved given the consolidated core-skin edge and core-bevel transition region resulting from the inventive thermoforming of FRTP skin-TP core panels as well as the joint geometry at the panel juncture;

(2) the three panel juncture of walls 3, 7 and 9 and 5, 7 and 9 form a compact nested corner 132 as seen in FIG. 7C which is self-sealing from environmental effects and eliminates or minimizes the use, cost and weight of sealant materials as well as improved load bearing and load distribution as described for two wall junctures of such edges and further minimizing tooling and inventory cost by utilizing a common geometry;

(3) Elimination of unique right and left half modular components for assembly of the container structure of side walls 3, 5, or 7 thus minimizing tooling, assembly and inventory of left-right configurations required for fabricating the panels;

(4) the joint formed recess approximate to the thickness of the core at the two wall juncture of walls 3 and 5 to 7 and at the three wall juncture of walls 3 and 7 to 9 and 5 and 7 to 9 prevents fasteners from protruding into the load volume of space 6 thereby maximizing the container's load volume;

(4) Improved impact and damage tolerance and interlaminar shear of the core-skin edge resulting from the thermoplastic contributed by the core to the consolidated, thermoformed region;

(5) Where edge thermoformed component panels are to be stored or transported prior to integration into an assembly, the configuration of edges 29, 31, 32, 37 and corner 38 allows for nested, flat stacking of multiple formed panels minimizing storage and transportation space.

While the disclosure herein of the thermoforming process, articles made from the process, and structures assembled therefrom is illustrative of the general principles and preferred embodiments of the invention, it is understood that the descriptions and embodiments herein are not intended to limit the claimed scope of the invention where modification of size, degree, steps, arrangement of parts, details of function or other features are variable but fall within the spirit and scope of the invention.

What is claimed is:

1. A modular cargo container (1) assembled with FRTP composite sandwich panels where external container loads are distributed throughout the assembled panels by integrally thermoformed panel edges and edge assemblies, said cargo container comprising:

a base (11) having a forward end (2) and a rearward end (4), and an edge rail (15) along said base's opposite sides and rear periphery said edge rail having an outer horizontal leg (19) and a vertical leg (21), three vertically planar panels (3, 5, 7), two opposite each other and the third located between the two, having an inner FRTP composite skin (23) being made of a fiber reinforcing a thermoplastic resin in a fixed proportion, an outer FRTP composite skin (25) being made of a fiber reinforcing a thermoplastic resin in a fixed proportion, a low density thermoplastic resin core (27) sandwiched between and integrally fixed to said inner skin and outer skin, a forward and rearward integrally thermoformed side edge (32), an integrally thermoformed upper edge (31), a plurality of integrally thermoformed radiused corners (38), an integrally thermoformed lower edge (29) which is attached to said base (11) along the length of lower edge (29) by a plurality of attachment means (39) attaching said lower edge to the vertical leg of said edge rail, a horizontally planar top panel (9) having an inner FRTP composite skin (33) being made of a fiber reinforcing a thermoplastic resin in a fixed proportion, an outer FRTP composite skin (35) being made of a fiber reinforcing a thermoplastic resin in a fixed proportion, said low density thermoplastic core (27) sandwiched between and integrally fixed to said inner skin (33) and outer skin (35), an integrally thermoformed periphery edge (37), a plurality of said integrally thermoformed radius corners (38), three right angled forward framing members (10, 12, 14) fixedly attached to forward end of said base (11), fixedly attached to forward ends of said side edges (32) of said opposite side panels and fixedly attached to periphery edge (37) of said top panel's forward end by a plurality of attachment means (18), a plurality of attachment means (20) to attach and assemble said vertical panels to each other along the length of their adjacent thermoformed side edges (32) and to attach thermoformed upper edges (31) of said vertical panels along their common length with thermoformed periphery edges (37) of said horizontal panel whereby the assembly of two side edges and the assembly of the upper edge to the periphery edge results into compact nested joints which distributes applied loads throughout the entire container assembly without the use of independent container stiffening members, a plurality of compact nested corner assemblies (132) resulting from the assembly of the radiused corners (38) of two adjacent vertical side panels and the radiused corner (38) of one horizontal top panel whereby said corner assembly is self sealing without the use of independent sealing means and said corner assembly distributes applied loads throughout the entire container assembly without the use of independent container stiffening members, an opening (6) serving as an access to the interior of container (1) and framed by said forward framing members (10, 12, 14) and forward end of said base.

2. The cargo container according to claim 1, wherein said low density thermoplastic resin core (27) is further comprised of polypropylene thermoplastic of a cellular honeycomb structure.

3. The cargo container according to claim 2, wherein the fiber reinforcing a thermoplastic resin in a fixed proportion of said inner skin (23) and outer skin (25) of said vertically planar panels is in a ratio of 50 to 75 percent of fiber to thermoplastic resin by weight and wherein the fiber reinforcing a thermoplastic resin in a fixed proportion of said inner skin (33) and outer skin (35) of said horizontally planar top panel is in a ratio of 50 to 75 percent of fiber to thermoplastic resin by weight.

4. The cargo container according to claim 3, wherein the fiber reinforcing a thermoplastic resin of said inner skin (23) and outer skin (25) of said vertically planar panels is fiberglass and wherein the fiber reinforcing a thermoplastic resin of said inner skin (33) and outer skin (35) of said horizontally planar top panel is fiberglass.

5. The cargo container according to claim 4, wherein the thermoplastic resin of said inner skin (23) and outer skin (25) of said vertically planar panels is polypropylene thermoplastic and wherein said inner skin (33) and outer skin (35) of said horizontally planar top panel is polypropylene thermoplastic.

6. The cargo container according to claim 5, wherein said base is further comprised of a plate (13), three edge rails (15) each at the opposite sides and rear periphery of said base and each edge rail having an inner horizontal leg (17), an outer horizontal leg (19), a vertical leg (21), and a plurality of attachment means (16) attaching said plate to said inner horizontal leg.

7. The cargo container according to claim 6, wherein said edge rails (15) are made of structural aluminum extrusions and said plate (13) is aluminum.

8. The cargo container according to claim 7, further comprising a closure means whereby said opening (6) is enclosed.

* * * * *